United States Patent [19]
Nelson et al.

[11] Patent Number: 6,014,144
[45] Date of Patent: Jan. 11, 2000

[54] RAPID COMPUTATION OF LOCAL EYE VECTORS IN A FIXED POINT LIGHTING UNIT

[75] Inventors: Scott R. Nelson, Pleasanton; Michael F. Deering, Los Altos, both of Calif.

[73] Assignee: Sun Microsystems, Inc., Palo Alto, Calif.

[21] Appl. No.: 09/017,973

[22] Filed: Feb. 3, 1998

[51] Int. Cl.$^7$ ...................................................... G06F 15/00
[52] U.S. Cl. ............................................................ 345/426
[58] Field of Search ................................ 345/426, 419, 345/420, 427, 117, 118, 121

[56] References Cited

U.S. PATENT DOCUMENTS

| | | | |
|---|---|---|---|
| 5,673,374 | 9/1997 | Sakaibara et al. | 395/126 |
| 5,805,782 | 9/1998 | Foran | 395/126 |
| 5,808,619 | 9/1998 | Choi et al. | 345/426 |
| 5,933,146 | 8/1999 | Wrigley | 345/420 |

*Primary Examiner*—Phu K. Nguyen
*Attorney, Agent, or Firm*—Conley, Rose & Tayon; Jeffrey C. Hood

[57] ABSTRACT

A rapid method for calculating a local eye vector in a fixed point lighting unit. For a given triangle primitive which is to be projected into a given viewport in screen space coordinates, the local eye vector corresponds to a given eye position and a first vertex of the given triangle primitive. (A different local eye vector is calculated for each vertex of the given triangle primitive). The method first comprises generating a view vector matrix which corresponds to the given eye position and corner coordinates of the given viewport, where the corner coordinates are expressed in screen space coordinates. The view vector matrix is usable to map screen space coordinates to an eye vector space which corresponds to the given viewport. The method next includes receiving a first set of coordinates (in screen space) which correspond to the first vertex. The first set of coordinates are then scaled to a numeric range which is representable by the fixed point lighting unit. Next, the first set of coordinates are transformed using the view vector matrix, which produces a non-normalized local eye vector within the eye vector space for the given viewport. The non-normalized local eye vector is normalized to form a normalized local eye vector. The normalized local eye vector is then usable to perform subsequent lighting computations such as computation of specular reflection values for infinite light sources, producing more realistic lighting effects than if an infinite eye vector were used. These more realistic lighting effects do not come at decreased performance, however, as the local eye vector may be calculated rapidly using this method.

23 Claims, 9 Drawing Sheets

Computer

XGL Specular Calculation

Open GL Specular Calculation

AFS Method of XGL Specular Calculation (y · tn) x 2 x tn - y
y = view vector (eye vector)
tn = transformed normal AFB XGL Reflection Computation

RAPID COMPUTATION OF LOCAL EYE VECTORS IN A FIXED POINT LIGHTING UNIT

FIELD OF THE INVENTION

The present invention relates to a 3-D graphics accelerator, and more particularly to a fixed point lighting unit within the 3-D graphics accelerator which performs rapid computation of local eye vectors.

DESCRIPTION OF THE RELATED ART

A three dimensional (3-D) graphics accelerator is a specialized graphics rendering subsystem for a computer system which is designed to off-load the 3-D rendering functions from the host processor, thus providing improved system performance. In a system with a 3-D graphics accelerator, an application program executing on the host processor of the computer system generates three dimensional geometry data that defines three dimensional graphics elements for output on a display device. The application program causes the host processor to transfer the geometry data to the graphics accelerator. The graphics accelerator receives the geometry data and renders the corresponding graphics elements on the display device.

One of the goals of many computer graphics systems is to be able to render objects that are realistic to the user. The problem of visual realism, however, is quite complex. Objects in the "real world" include an incredible amount of detail, including subtle variations in color, reflections, and surface irregularities.

One of the most important ways in which graphics systems seek to increase visual realism is by trying to capture the complex ways in which light interacts with physical objects. For this reason, dedicated units have been used to increase lighting performance. The design of these lighting units embodies a balance between increasing realism, maintaining performance, and minimizing cost.

Applications which display three-dimensional graphics require a tremendous amount of processing capabilities. For example, for a computer system to generate smooth 3-D motion video, the computer system is required to maintain a frame rate or update rate of between 20 to 30 frames per second. This requires a 3-D computer graphics accelerator capable of processing over a million triangles per second. This includes lighting calculations involving multiple light sources with specular highlights (not just a single diffuse light).

One constraint on prior art lighting units is the use of floating point arithmetic. Floating point math is used in lighting units since some parameters involved in lighting computations (attenuation factors, for example) necessitate the full range of IEEE floating point numbers. A major disadvantage of floating point arithmetic, however, is that the required hardware is relatively expensive in terms of size. This is problematic for lighting units in lower-cost graphics systems seeking to maximize performance, particularly in view of the fact the majority of lighting operations do not require the full range of floating point math.

Another tradeoff made in lighting units involves the use of an infinite eye position when performing specular highlight calculations for infinite light sources. In specular reflection (as opposed to diffuse reflection), the surface of the object appears to be the color of the incident light. This is why a portion of an apple illuminated with a bright light appears to be white, while the rest of the apple appears red. In order to accurately model specular reflection, a "local" eye position should ideally be used to calculate lighting effects. Eye position is a location in world space which denotes the distance and orientation of the viewer to the 3-D scene being rendered. By using a local eye position, the location of the specular reflection may realistically be rendered for a given object.

Prior art graphics systems generally use the infinite eye position when calculating specular reflection values, however. This is done because the calculation of the local eye vector (a vector from the local eye position to the vertex of the triangle primitive being lighted) is too time-consuming and limits lighting performance. Although the use of the infinite eye position when calculating specular highlights for infinite light sources produces lighting effects that are acceptable, it is not ideal.

It would therefore be desirable to have a lighting unit which is able to rapidly compute the local eye vector for specular highlights involving infinite light sources. It would also be desirable for this lighting unit not to be constrained to the use of floating point arithmetic at the expense of decreased performance and increased cost.

SUMMARY OF THE INVENTION

The present invention comprises a rapid method for calculating a local eye vector in a fixed point lighting unit. For a given triangle primitive which is to be projected into a given viewport in screen space coordinates, the local eye vector corresponds to a given eye position and a first vertex of the given triangle primitive. (A different local eye vector is calculated for each vertex of the given triangle primitive).

The method first comprises generating a view vector matrix which corresponds to the given eye position and corner coordinates of the given viewport, where the corner coordinates are expressed in screen space coordinates. The view vector matrix is usable to map screen space coordinates to an eye vector space which corresponds to the given viewport. The method next includes receiving a first set of coordinates (in screen space) which correspond to the first vertex. The first set of coordinates are then scaled to a numeric range which is representable by the fixed point lighting unit. Next, the first set of coordinates are transformed using the view vector matrix, which produces a non-normalized local eye vector within the eye vector space for the given viewport. The non-normalized local eye vector is normalized to form a normalized local eye vector. The normalized local eye vector is then usable to perform subsequent lighting computations such as computation of specular reflection values for infinite light sources, producing more realistic lighting effects than if an infinite eye vector were used. These more realistic lighting effects do not come at decreased performance, however, as the local eye vector may be calculated rapidly using this method.

Calculation of the view vector matrix first includes generating an inverse matrix from the current viewing matrix. (The current viewing matrix is used to transform vertices from world space coordinates to screen space coordinates in an earlier stage of the graphics pipeline). World coordinates are then computed for the given eye position using the inverse matrix. Next, world space coordinates for corner coordinates of the given viewport are determined using the inverse matrix and clip space coordinates of the given viewport. World space coordinates for the corner coordinates of the given viewport are then normalized, as well as the world space coordinates for the given eye position. The method further includes generating a plurality of vectors in world space coordinates from the normalized world space eye coordinates to each of the normalized world space corner coordinates, which form the corners of the view volume. This plurality of vectors are then normalized to a front clipping plane (Z=1) of the given viewport. Next, the size of the projection of the plurality of vectors on to the given viewport is determined, as well as the center offset of the projection. The size and center offset of the given viewport are calculated in screen space coordinates, and are adjusted to the numeric range of the lighting unit.

The size and center offset of the projection are used along with the size and center offset of the given viewport to calculate the non-normalized view vector matrix components. Next, the maximum input values to the view vector matrix are computed, which allows determination of a maximum view vector length. The non-normalized view vector matrix components are then scaled to keep the maximum vector length within a predetermined range for the given viewport, thereby producing final view vector matrix component values. Finally, a determination is made whether the final view vector matrix components form a valid matrix.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE EMBODIMENTS

Figure 1:
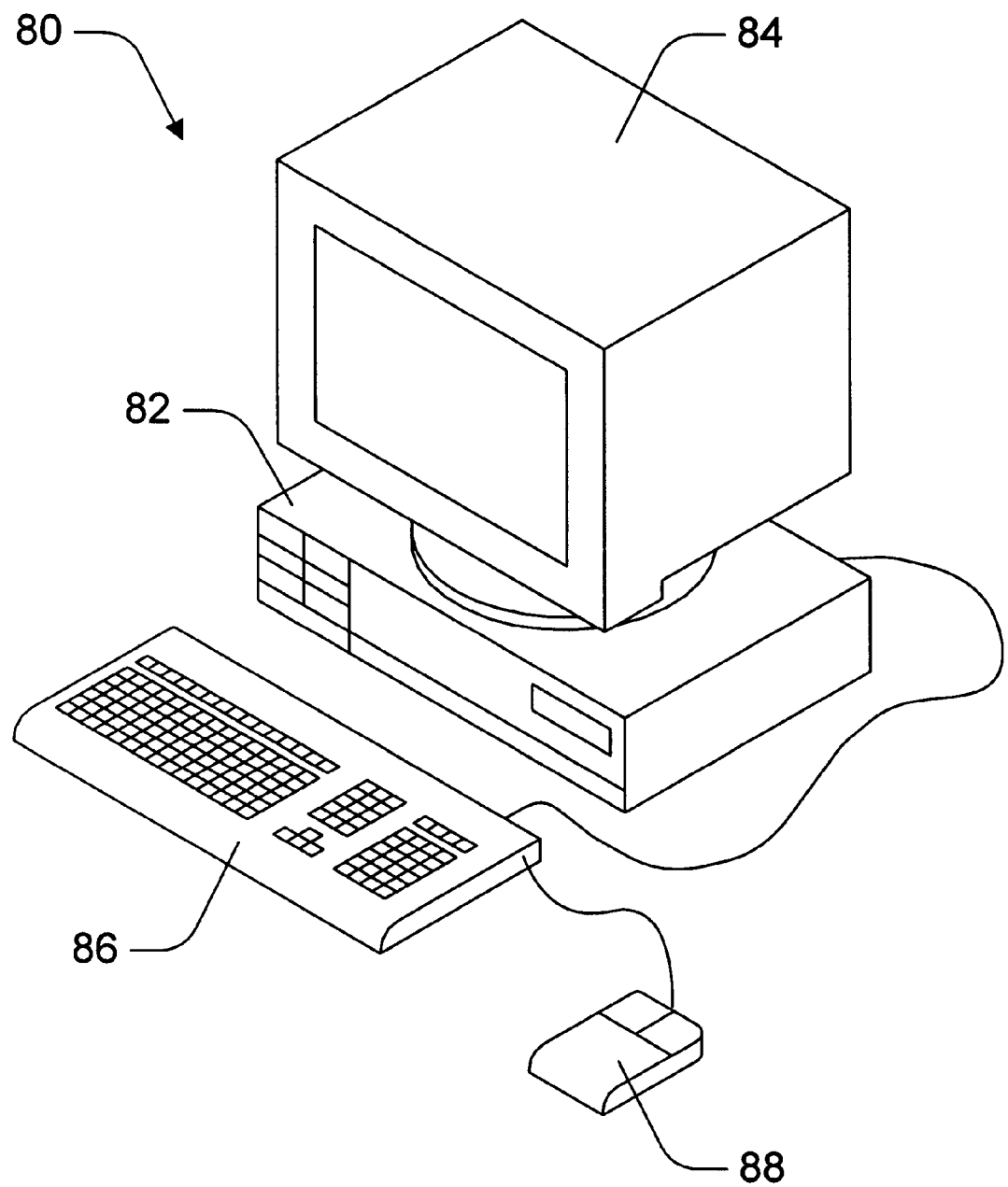
FIG. 1 illustrates a computer system which includes a three dimensional (3-D) graphics accelerator according to the present invention.

FIG. 1—Computer System

Referring now to FIG. 1, a computer system 80 which includes a three-dimensional (3-D) graphics accelerator according to the present invention is shown. As shown, the computer system 80 comprises a system unit 82 and a video monitor or display device 84 coupled to the system unit 82. The display device 84 may be any of various types of display monitors or devices. Various input devices may be connected to the computer system, including a keyboard 86 and/or a mouse 88, or other input. Application software may be executed by the computer system 80 to display 3-D graphical objects on the video monitor 84. As described further below, the 3-D graphics accelerator in computer system 80 includes a fixed point lighting unit which is configured to perform rapid computation of normalized local eye vectors for calculation of specular highlights corresponding to infinite light sources. The use of these local eye vectors results in more realistic lighting effects of graphical objects rendered on display device 84.

Figure 2:
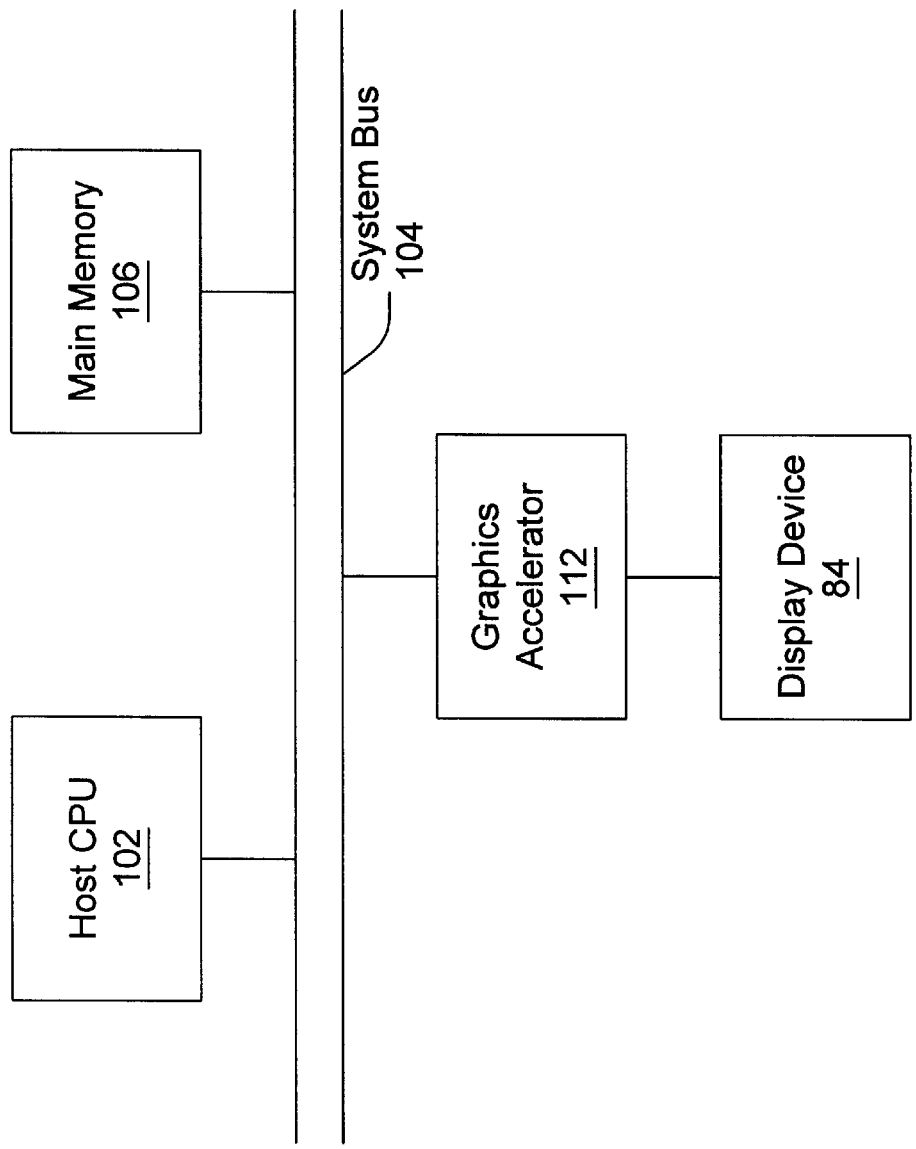
FIG. 2 is a simplified block diagram of the computer system of FIG. 1.

FIG. 2—Computer System Block Diagram

Referring now to FIG. 2, a simplified block diagram illustrating the computer system of FIG. 1 is shown. Elements of the computer system which are not necessary for an understanding of the present invention are not shown for convenience. As shown, the computer system 80 includes a central processing unit (CPU) 102 coupled to a high speed bus or system bus 104. A system memory 106 is also preferably coupled to the high speed bus 104.

The host processor 102 may be any of various types of computer processors, multi-processors and CPUs. The system memory 106 may be any of various types of memory subsystems, including random access memories and mass storage devices. The system bus or host bus 104 may be any of various types of communication or host computer buses for communication between host processors, CPUs, and memory subsystems, as well as specialized subsystems. In the preferred embodiment, the host bus 104 is the UPA bus, which is a 64 bit bus operating at 83 MHz.

A 3-D graphics accelerator 112 according to the present invention is coupled to the high speed memory bus 104. The 3-D graphics accelerator 112 may be coupled to the bus 104 by, for example, a cross bar switch or other bus connectivity logic. It is assumed that various other peripheral devices, or other buses, may be connected to the high speed memory bus 104, as is well known in the art. It is noted that the 3-D graphics accelerator may be coupled to any of various buses, as desired. As shown, the video monitor or display device 84 connects to the 3-D graphics accelerator 112.

The host processor 102 may transfer information to and from the graphics accelerator 112 according to a programmed input/output (I/O) protocol over the host bus 104. Alternately, the graphics accelerator 112 accesses the memory subsystem 106 according to a direct memory access (DMA) protocol or through intelligent bus mastering.

A graphics application program conforming to an application programmer interface (API) such as OpenGL or XGL generates commands and data that define a geometric primitive such as a polygon for output on display device 84. These primitives are modeled as being illuminated by light sources having attributes which are also defined by the application program. Host processor 102 transfers these commands and attribute data to memory subsystem 106. Thereafter, the host processor 102 operates to transfer the data to the graphics accelerator 112 over the host bus 104. Alternatively, the graphics accelerator 112 reads in geometry data arrays using DMA access cycles over the host bus 104. In another embodiment, the graphics accelerator 112 is coupled to the system memory 106 through a direct port, such as the Advanced Graphics Port (AGP) promulgated by Intel Corporation. Graphics accelerator 112 next performs lighting operations (including computation of local eye vectors) on the transferred primitives (after transformation), generating color values on a per-vertex basis in the preferred embodiment. Subsequent rendering operations are then performed upon the lighted primitives.

Figure 3:
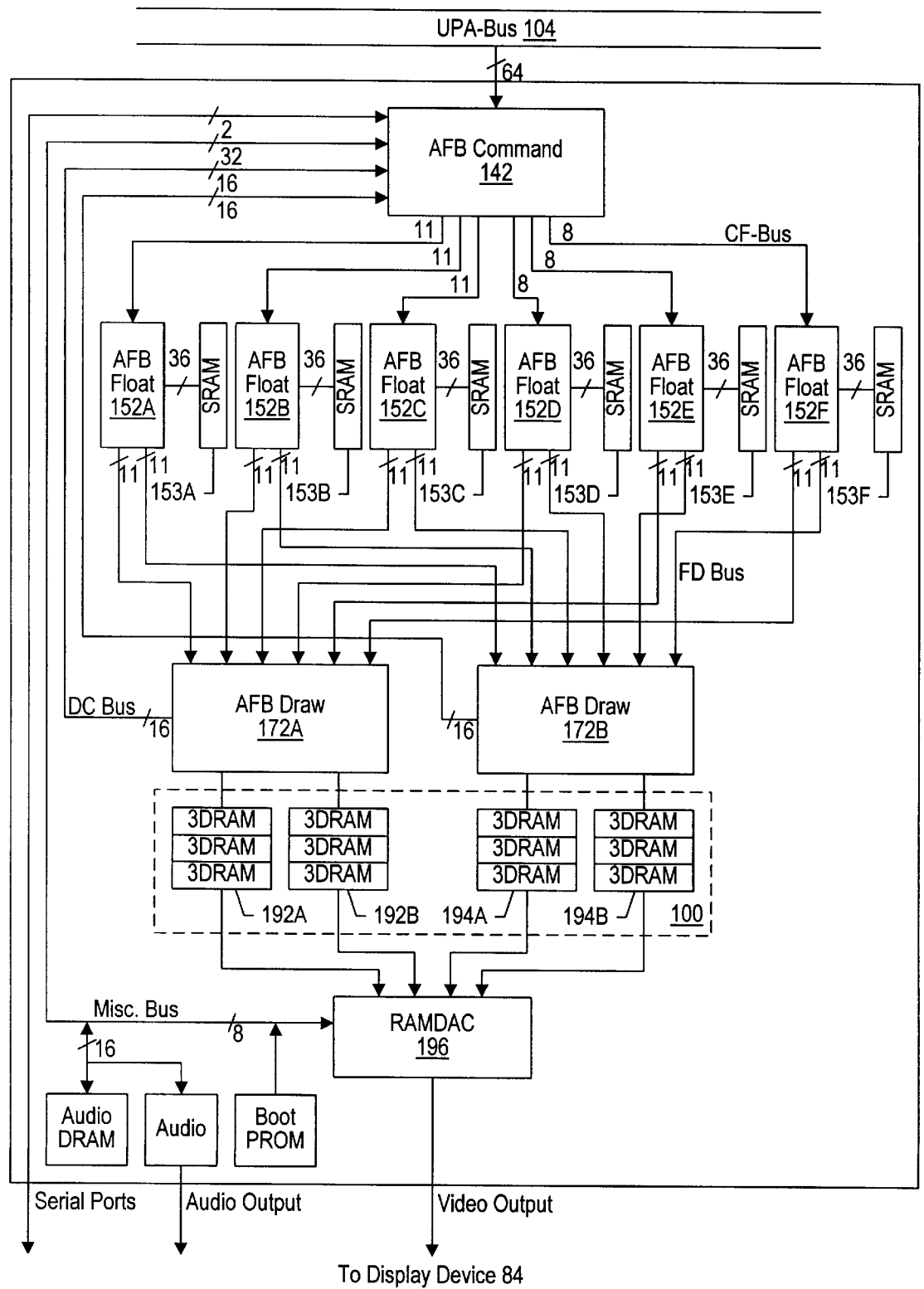
FIG. 3 is a block diagram illustrating the 3-D graphics accelerator according to the preferred embodiment of the present invention.

FIG. 3—Graphics Accelerator

Referring now to FIG. 3, a block diagram is shown illustrating the graphics accelerator 112 according to the preferred embodiment of the present invention. As shown, the graphics accelerator 112 is principally comprised of a command block 142, a set of floating-point processors 152A–152F, a set of draw processors 172A and 172B, a frame buffer 100 comprised of 3DRAM, and a random access memory/digital-to-analog converter (RAMDAC) 196.

As shown, the graphics accelerator 112 includes command block 142 which interfaces to the memory bus 104. The command block 142 interfaces the graphics accelerator 112 to the host bus 104 and controls the transfer of data between other blocks or chips in the graphics accelerator 112. The command block 142 also pre-processes triangle and vector data and performs geometry data decompression.

The command block 142 interfaces to a plurality of floating point blocks 152. The graphics accelerator 112 preferably includes up to six floating point processors labeled 152A–152F, as shown. The floating point processors 152A–152F receive high level drawing commands and generate graphics primitives, such as triangles, lines, etc. for rendering three-dimensional objects on the screen. The floating point processors 152A–152F perform transformation, clipping, face determination, lighting and set-up operations on received geometry data. Each of the floating point processors 152A–152F connects to a respective memory 153A–153F. The memories 153A–153F are preferably 32 k×36-bit SRAM and are used for microcode and data storage.

Each of the floating point blocks 152A–F connects to each of two draw processors 172A and 172B. The graphics accelerator 112 preferably includes two draw processors 172A and 172B, although a greater or lesser number may be used. The draw processors 172A and 172B perform screen space rendering of the various graphics primitives and operate to sequence or fill the completed pixels into the 3DRAM array. The draw processors 172A and 172B also function as 3DRAM control chips for the frame buffer 100. The draw processors 172A and 172B concurrently render an image into the frame buffer 100 according to a draw packet received from one of the floating-point processors 152A–152F, or according to a direct port packet received from the command processor 142.

Each of the floating point blocks 152A–F preferably operates to broadcast the same data to the two drawing blocks 172A and 172B. In other words, the same data is always on both sets of data lines coming from each floating point block 152. Thus, when the floating point block 152A transfers data, the floating point block 152A transfers the same data over both parts of the FD-bus to the draw processors 172A and 172B.

Each of the respective drawing blocks 172A and 172B couple to frame buffer 100, wherein frame buffer 100 comprises four banks of 3DRAM memory 192A–B, and 194A–B. The draw processor 172A couples to the two 3DRAM banks 192A and 192B, and the draw processor 172B couples to the two 3DRAM banks 194A and 194B, respectively. Each bank comprises three 3DRAM chips, as shown. The 3DRAM memories or banks 192A–B and 194A–B collectively form the frame buffer 100, which is 1280×1024 by 96 bits deep. The frame buffer stores pixels corresponding to 3-D objects which are rendered by the draw processors 172A and 172B.

Each of the 3DRAM memories 192A–B and 194A–B couple to a RAMDAC (random access memory digital-to-analog converter) 196. The RAMDAC 196 comprises a programmable video timing generator and programmable pixel clock synthesizer, along with cross-bar functions, as well as traditional color look-up tables and triple video DAC circuits. The RAMDAC in turn couples to the video monitor 84.

The command block is preferably implemented as a single chip. Each of the floating point processors 152 are preferably implemented as separate chips. In the preferred embodiment, up to six floating point blocks or chips 152A–F may be included. Each of the drawing blocks or processors 172A and 172B also preferably comprise separate chips. For more information on different aspects of the graphics accelerator architecture of the preferred embodiment, please see related co-pending application Ser. No. 08/673,492 entitled "Three-Dimensional Graphics Accelerator With Direct Data Channels for Improved Performance", and related co-pending application Ser. No. 08/673,491 entitled "Three-Dimensional Graphics Accelerator Which Implements Multiple Logical Buses Using Common Data Lines for Improved Bus Communication", both filed on Jul. 1, 1996.

As described above, command block 142 interfaces with host bus 104 to receive graphics commands and data from host CPU 102. These commands and data (including triangle primitives and corresponding light parameter data) are passed in turn to floating point processors 152 for transformation, lighting, and setup calculations. The general operation of these floating point processors 152, which are advantageously configured for improved lighting performance, is described with reference to FIG. 4. The L-core block within each of the floating point processors 152, which provide this improved lighting capability, are described more specifically with reference to FIG. 5. FIGS. 6A, 6B, 7, and 8 describe the computation of local eye vectors using this fixed point lighting unit.

Figure 4:
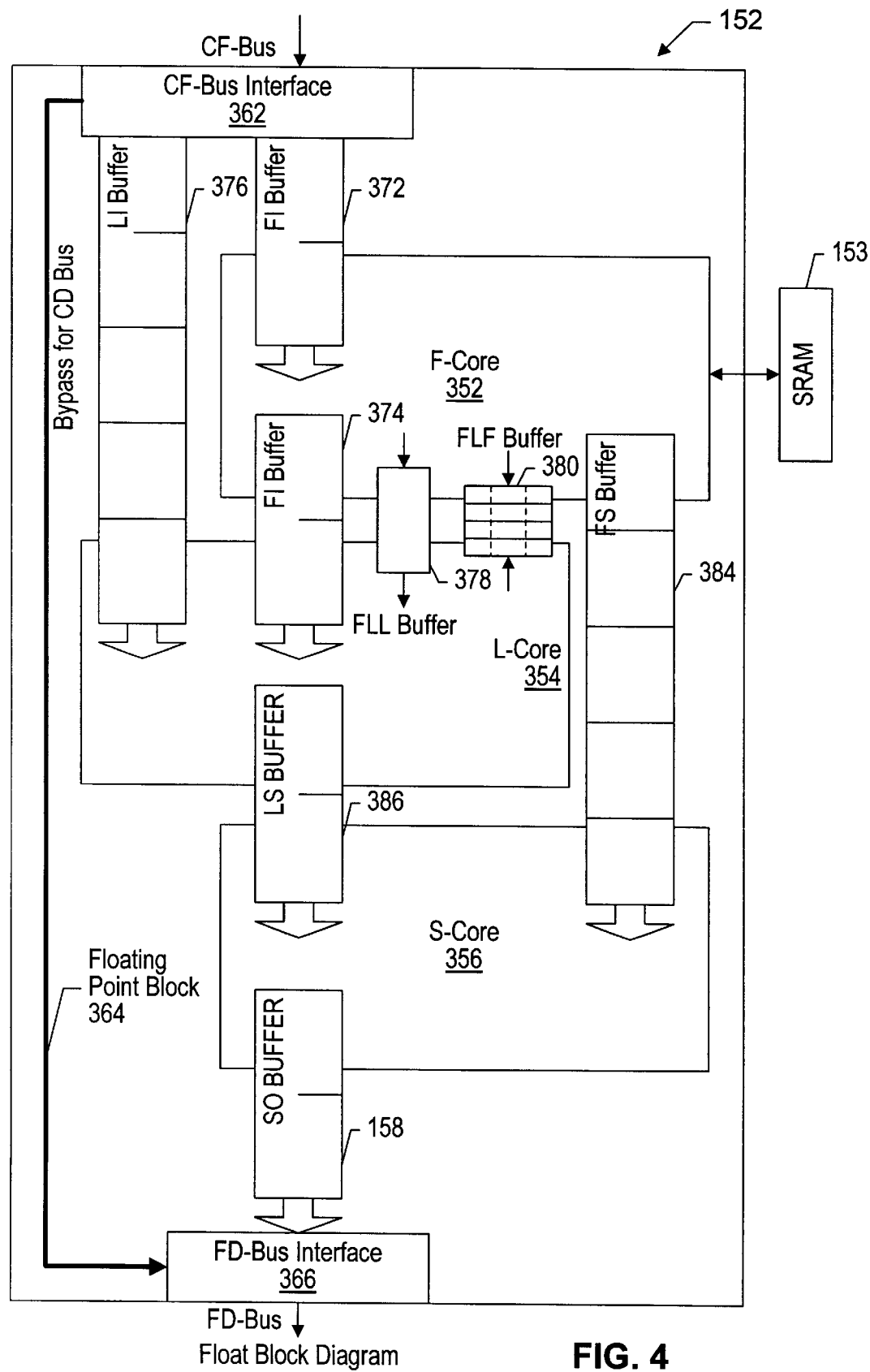
FIG. 4 is a block diagram illustrating one of the floating point processors in the 3-D graphics accelerator according to the preferred embodiment of the present invention.

FIG. 4—Floating Point Processor Block Diagram

Referring now to FIG. 4, a block diagram illustrating one of the floating point processors 152 according to the preferred embodiment of the present invention is shown. Each of the respective floating point processors 152A–152F are identical, and thus only one is described here for convenience. As shown, each of the floating point blocks 152 includes three main functional units or core processors, these being F-core 352, L-core 354, and S-core 356. The F-core block 352 is coupled to receive data from the CF-bus transferred from the Command block 142. The F-core block 352 provides output data to each of the L-core block 354 and the S-core block 356. The L-core block 354 also provides data to the S-core block 356. The S-core block 356 provides output data to the FD bus.

The F-core block 352 performs all floating point intensive operations, including geometry transformation, clip testing, face determination, perspective division, and screen space conversion. The F-core block 352 also performs clipping when required. In the preferred embodiment, the F-core block 352 is fully programmable, using a 36-bit micro instruction word stored in a 32 k word SRAM.

The L-core block 354 performs most lighting calculations using on-chip RAM-based microcode. Unlike prior art lighting units, L-core block 354 uses fixed point arithmetic to effect these calculations. In the preferred embodiment, the numeric range of L-core block 354 is −2.0 to +2.0, using a s1.14 format (one sign bit, one integer bit, and fourteen fractional bits). The majority of lighting calculations may be performed within this range using these type of 16-bit operands. Some parameters (such as attenuation factors) needed for lighting calculations, however, exceed this range, and are handled in F-core block 352.

The L-core block 354 block also includes an efficient triple-word design for more efficient lighting calculations. This triple-word design operates with a 48-bit data word comprising 16-bit fixed point values. Thus one instruction can perform the same function on all three color components (RGB) or all three components of a normal ($N_x$, $N_y$, and $N_z$ in one cycle. The math units comprised in the L-core block 354 automatically clamp values to the allowed numeric range, thus requiring no additional branches.

The S-core block performs setup calculations for all primitives. These set-up calculations involve computing the distances in multiple dimensions from one vertex to another and calculating slopes along that edge. For triangles, the slopes of the Z depth, the color, and the UV (for texture) are also computed in the direction of a scan line.

As shown, each of the floating point blocks 152 includes CF-bus interface logic 362 which couples to the CF-bus. Each of the floating point blocks 152 includes FD-bus interface logic 366 which couples to the FD-bus. Each floating point block 152 includes a bypass bus or data path 364 which serves as the data transfer path through a respective floating point block 152 for the CD bus. Data which is sent over the CD bus, i.e., which is sent directly to the FD bus, travels on the data transfer bus 364, thus bypassing the floating point logic comprised in the floating point block 152.

In general, data which is provided to the floating point block 152 can have one of three destinations, these being the F-core block 352, the L-core block 354, or directly out to the FD bus, i.e., a CD bus transfer. In the preferred embodiment, data which is destined for the F-core block 352 comprises 32-bit words, including 32-bit IEEE floating point numbers and other 32-bit data. Data destined for the L-core block 354 comprises 48-bit words comprising three 16-bit fixed point numbers.

As shown, the floating point block 152 includes a float input buffer (FI buffer) 372 which receives data from the CF-bus which was provided by the command block 142. The FI buffer 372 is double-buffered and holds 32 32-bit entries in each buffer. The first word, word zero, stored in the FI buffer 372 comprises an opcode which informs the F-core block 352 which microcode routine to dispatch for the received geometric primitives. Only the header and X, Y and Z coordinates are provided to this buffer when transforming and lighting geometric primitives.

The floating point block 152 also includes an F-core to L-core buffer (FL buffer) 374. The FL buffer 374 is double buffered and holds 16 16-bit entries in each buffer. The F-core block 352 operates to write or combine three F-core words into one L-core word which is provided to the FL buffer 374. From the L-core perspective, each buffer in the FL buffer 374 appears as five 48-bit entries. During lighting operations, three X, Y, Z coordinates are sent from the F-core block 352 through the FL buffer 374 to the L-core block 354. These three X, Y, Z coordinates are used to compute eye direction.

The floating point block 152 includes an L-core input buffer (LI buffer) 376 which receives data sent across the CF-bus which was provided from the command block 142 and provides this data to the L-core block 354. The LI buffer 376 comprises five buffers, each of which hold seven 48-bit entries. These seven 48-bit entries comprise three vertex normals, three vertex colors and one word with three alpha values. The FI buffer 372 and the LI buffer 376 collectively comprise the floating point block input buffer.

The floating point block 152 also includes an FLL buffer 378, which connects between the F-core block 352 and the L-core block 354. The FLL buffer 378 is a FIFO used for transmitting lighting and attenuation factors from the F-core block 352 to the L-core block 354. These attenuation factors comprise three X,Y,Z position values, three attenuation values, three ambient light values, and one attenuation shift word containing three packed values. An FLF buffer 380 is also provided between the F-core block 352 and the L-core block 354. The FLF buffer is a bi-directional buffer used for communicating data between the F-core block 352 and the L-core block 354 under F-core control.

An L-core to S-core buffer (LS buffer) 386 is coupled between the L-core block 354 and the S-core block 356. The LS buffer 386 is double-buffered with each buffer holding four 48-bit words.

The floating point block 152 also includes an F-core to S-core buffer (FS buffer) 384 which is used for transferring data from the F-core block 352 to the S-core block 356. The FS buffer comprises five buffers which each hold 32 32-bit values. These five buffers are designed to match the pipeline stages of the L-core block 354, these being the two FL buffers, the two LS buffers, plus one primitive which may be stored in the L-core block 354. Data transferred from the F-core block 352 through this buffer to the S-core block 356 includes a dispatch code that indicates which microcode procedure to run in the S-core block 356.

Finally, the floating point block 152 includes an S-core output buffer (SO buffer) 158 which is coupled between the S-core block 356 and the FD bus interface 366. The SO buffer 158 collects data to be sent across the FD bus to the respective draw processors 172A–172B. The SO buffer 158 is double buffered and holds 32 32-bit words in each buffer. The SO buffer 158 holds up to two primitives comprising fixed point data in the order needed by the respective draw processors 172A–172B. S-core block 356 conveys additional status information along with the fixed point data to draw processors 172. For example, a status bit is conveyed with each entry indicating whether or not a given primitive is the last of a group of related primitives. The SO buffer 158 includes a separate status register which indicates how many words are valid so that the minimum number of cycles are used to transfer the data across the bus. The SO buffer 158 comprises the floating point block output buffer 158.

Figure 5:
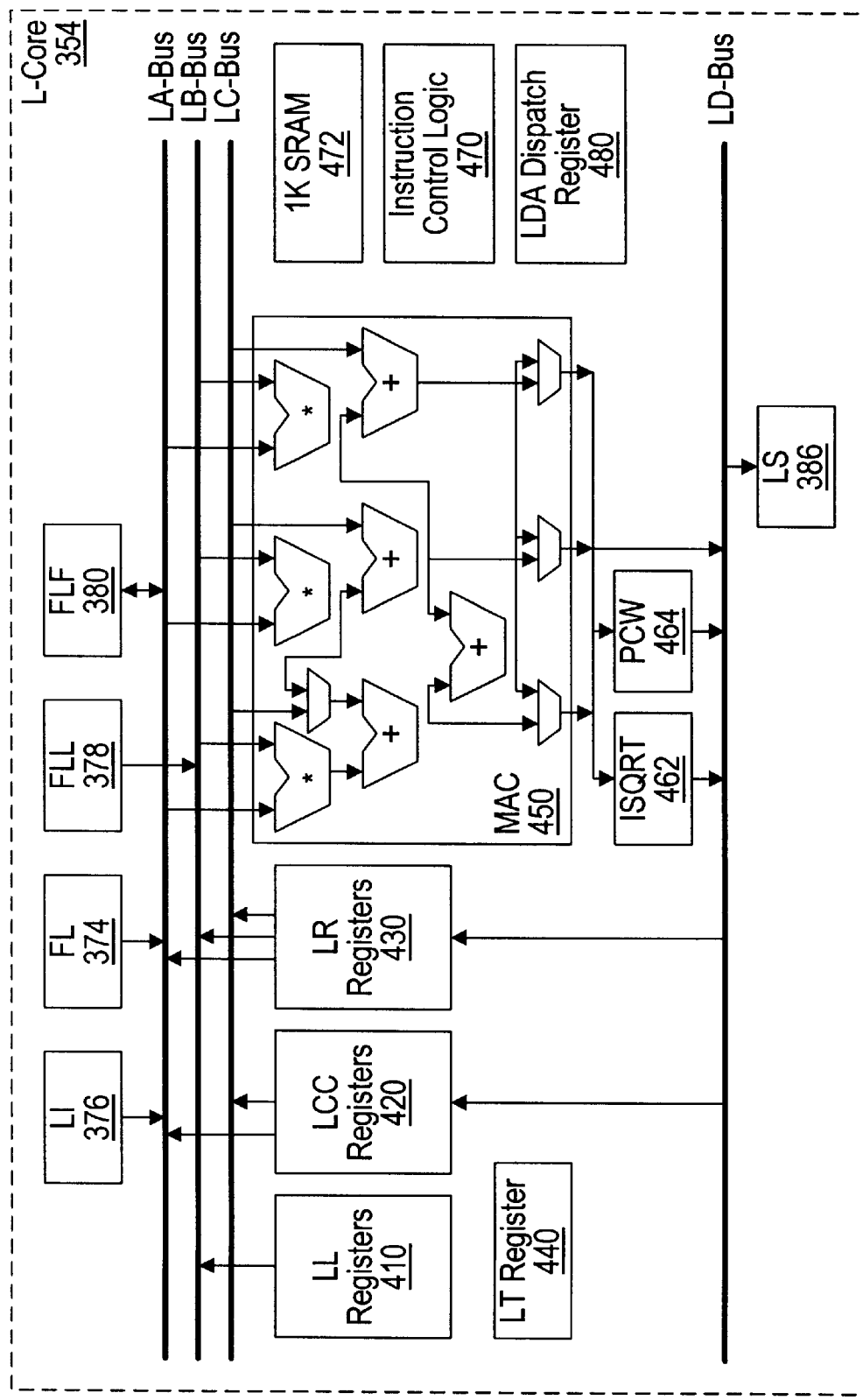
FIG. 5 is a block diagram illustrating the fixed point lighting unit in the preferred embodiment of the present invention.

FIG. 5—L-Core Block Diagram

Referring now to FIG. 5, a block diagram illustrating the L-Core block 354 in each of the floating point processors 152 is shown. The L-core block 354 comprises a fixed point computational unit for performing lighting computations. As depicted, L-core block 354 receives data from LI buffer 376, FL buffer 374, FLL buffer 378, and bi-directional FLF buffer 380. Information is stored within L-core block 354 in LL (light) register file 410, LCC (color) register file 420, and LR (general purpose) register file 430. Operands are conveyed from register files 410, 420, and 430 to an LA-bus, an LB-bus, and an LC-bus to a multiply-accumulate block 450 for lighting computations. These computations are performed under control of instruction control logic block 470, executing microcode stored in an SRAM 472. Additional lighting computations are performed in an inverse square root (ISQRT) block 462 and a power function unit 464. Lighting results are conveyed on an LD-bus, and conveyed to S-core block 356 via LS buffer 386.

The L-core processor 354 is designed specifically to perform lighting calculations. In the preferred embodiment, the L-core block 354 performs the majority of the lighting operations (specifically, those for which the operands are within the −2.0 to +2.0 fixed point range). The F-core block 352 performs lighting computations for more complex light sources which require the use of a general purpose floating point processor, such as point and spot light sources.

In the preferred embodiment, all calculations in L-core block 354 are performed using 16-bit fixed-point math, three at a time. The three values in a 48-bit word may either represent one triple such as XYZ, normal, or RGB, or may represent a value (e.g., an alpha value) for each three different vertices of a triangle. The lighting computation performed by L-core 354 does not use pre-multiplied material color with other lighting attribute's cached values. This allows the graphics accelerator to support RGB per-vertex color triangle meshes as a high quality alternative to texture and bump mapping. In general, most lighting operations are expected to include a per-vertex color change. While this requires some increased computation in the L-Core block 354, it is completely overlapped by other units (i.e., L-Core is still faster than both F-Core and S-Core). This change also makes it much easier to support OpenGL's semantics, in which colors might change at any vertex without warning and without any effective way of caching.

The L-Core 354 has efficient 16-bit function units and also performs the model space to world space transformation on vertex normals. The command block 142 delivers normal data to the floating point processor 152 as 48-bit values (3 16-bit components), already normalized. The L-Core registers include two 3×3 normal transformation matrices, stored as three 48-bit values each. The two transformation matrices are used to perform left and right eye transformations in stereo mode.

Colors and normals are transferred from the command block 142 to L-Core 354 by way of the LI-Buffer 376. The lighting calculations are performed in response to microcode instructions residing in SRAM 472 and executing under control of instruction control logic 470 and a dispatch word passed in from F-core block 352. The L-Core instruction set does not include branch instructions, so each step of the lighting calculation runs to completion, then the next step is started based on the contents of the next dispatch word.

The L-Core 354 includes three different register files in addition to the input and output buffers. The LL registers 410 contain the values for each of up to 32 lights. LT register 440 specifies which light to access, since only one light may be accessed at a time. The light values are loaded by F-Core 352 and are not modified by L-Core 354. The LR registers 430 are used as general purpose registers for storing intermediate values from the lighting computations. The LCC registers 420 hold the material properties or "current color" values for primitive vertices.

L-Core block 354 includes multiply-accumulate block 450, including one unit for each of the three 16-bit values in the 48-bit word. Standard operation of each of the multiply-accumulate units is 48 bits in and 48 bits out. For the dot product calculation, there is only a 16-bit result, so this result is replicated into each of the three 16-bit fields.

Inverse square root (ISQRT) block 462 is used in normalizing the viewpoint vector. The ISQRT block 462 receives 16 bits from a dot product calculation and produces a 16-bit result, replicated to three values in the 48-bit word. Furthermore, the L-Core 354 also includes a power function unit 464 which is used for computing specular highlights. The power function unit 464 also takes in 16 bits from a dot product calculation and produces a 16-bit result, replicated to three values in the 48-bit word. The power function unit 464 performs two table lookups and performs other calculations to produce an accurate value. The result is accurate to 0.5%, or accurate to a least significant bit of an 8-bit color.

L-Core Communication Buffers

The L-Core 354 includes five different buffers for communicating with other parts of the chip. The LI Buffer 376 corresponds to the FI buffer 372 in F-Core block 352. The LI Buffer 376 is used for accessing incoming data from command block 142 coming across the CF-Bus. The LI Buffer 376 appears as seven 48-bit registers and contains three colors, three normals, and one word containing the three alpha values. Like the FS registers 384 in F-Core 352, the LI buffer 376 comprises five buffers to match up with the two FI Buffers 372, the two FL buffers 374, plus the one primitive that is being processed in F-Core 352.

The FL Buffer 374 is used to receive the XYZ viewpoint vector from F-Core 352. The FL Buffer 374 is also used to store clipped RGB color and alpha values when necessary. The FLL FIFO 378 is used for passing attenuation values for local lights. These values require floating-point computations that may only be performed in F-Core 352. When the lighting calculations get to the point where the attenuation factor is needed for a light, L-Core 354 pauses until the data is available in the FLL FIFO 378.

The FLF Buffer 380 is for communication between L-Core and F-Core and is not intended for normal operation. One run-time use of the FLF buffer 380 is to send lighting values back to L-Core 354 during clipping and for F-Core to "borrow" the power function logic from L-Core 354 for use with spot lights. To do this, F-Core writes the two power function parameters to the FLF buffer 380, then interrupts L-core and requests that the computation be performed. When computations are complete, the result is placed back into the FLF buffer 380 and L-Core 354 is allowed to continue. F-Core 352 then reads the result out of its side of the FLF buffer 380. The FLF buffer 380 is also used for diagnostic purposes.

The LS Buffer 386 comprises the write-only output registers used to send data to S-Core 356 for setup computations. Only colors and alpha values are sent across this interface. For standard triangles, three colors and one alpha word (containing three values) are sent to S-Core 356. In the preferred embodiment, the LS Buffer 386 comprises four double-buffered entries.

Graphics Coordinates Systems

When host CPU 102 transfers geometry primitives to graphics accelerator 112, vertices of these primitives are typically expressed in terms of three-dimensional model space coordinates (also called world space coordinates). World space coordinates may be expressed in whatever units are convenient for representation (e.g., feet, miles, meters, etc.). Before processing by subsequent pipeline stages, these coordinates undergo a view transformation operation, performed in F-core block 352, which converts these vertices to screen space coordinates. Screen space is measured in terms of pixels (or fractions thereof), and is bounded by the maximum pixel coordinates of the screen (e.g., 1280×1024 pixels).

The view transformation operation performed in F-core block 352 comprises multiplying a transform matrix (referred to herein as a "current viewing matrix") with a vector representing the input coordinate values. Multiplying the input coordinate vector with the transform matrix has a variety of effects, including mapping the vertex coordinates to a pre-defined eye position (which denotes the position of the viewer in world space coordinates). The transform also uses a fourth vertex coordinate, W, to provide a perspective projection of the primitive.

Another effect of the transformation operation in F-core block 352 is the window-to-viewport transformation. The "window" is a region (typically rectangular) in world coordinates in which defines where the primitive is located. The "viewport" is a corresponding region in screen space coordinates in which the primitive will actually be rendered. As a result of the window-to-viewport transformation, a given primitive may be scaled, clipped, etc. by F-core block 352. As described above, vertices (in screen space coordinates) are then sent to L-core block 354 via FL buffer 374 for lighting computations.

In order to calculate the local eye vector, both the eye position (which is in world space coordinates), and the vertex position (which is in screen space coordinates) must be considered. As will be described below, the local eye vector is calculated using a view vector matrix which transforms a vertex in screen space to an eye vector space (in world coordinates). The view vector matrix is computed in part from the inverse matrix of the current viewing matrix, which provides a back-transform of the vertex coordinates to world space.

Figure 6A:
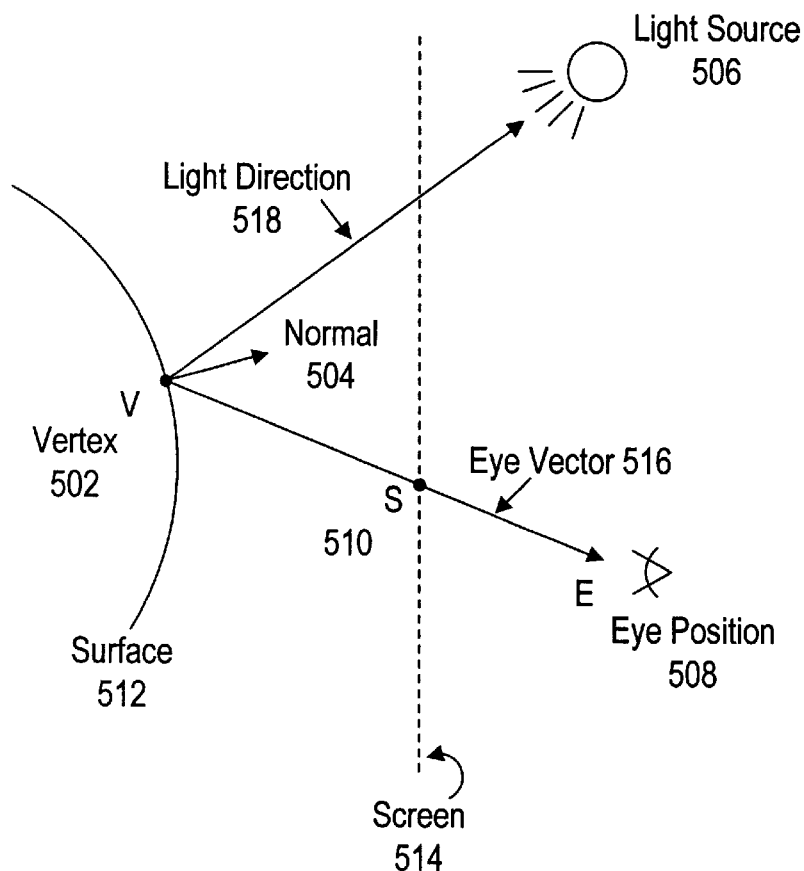
FIG. 6A illustrates the relationship of the eye vector for a vertex to a point S on a display screen.

Referring now to FIG. 6A, a vertex ("V") 502 on a surface 512 is depicted. An eye vector 516 extends from the vertex 502 to an eye position 508. Vector 516 passes through z=0 (in world space coordinates) at point ("S") 510. The screen 514 of display device 84 is considered to lie in the plane z=0 (as shown in the side view illustrated in FIG. 6A). In graphics standards such as XGL and OpenGL, calculations such as specular reflection values involve not only eye vector 516, but also surface normal 504 and light direction vector 518, which extends from vertex 502 to light source 506. In prior art systems (with floating point lighting units), the local eye vector was computed by subtracting the position of vertex 502 (back-transformed to world space) from the eye position 508. Because these distances may be quite large, however, they may exceed the numeric range of L-core block 354.

Figure 7:
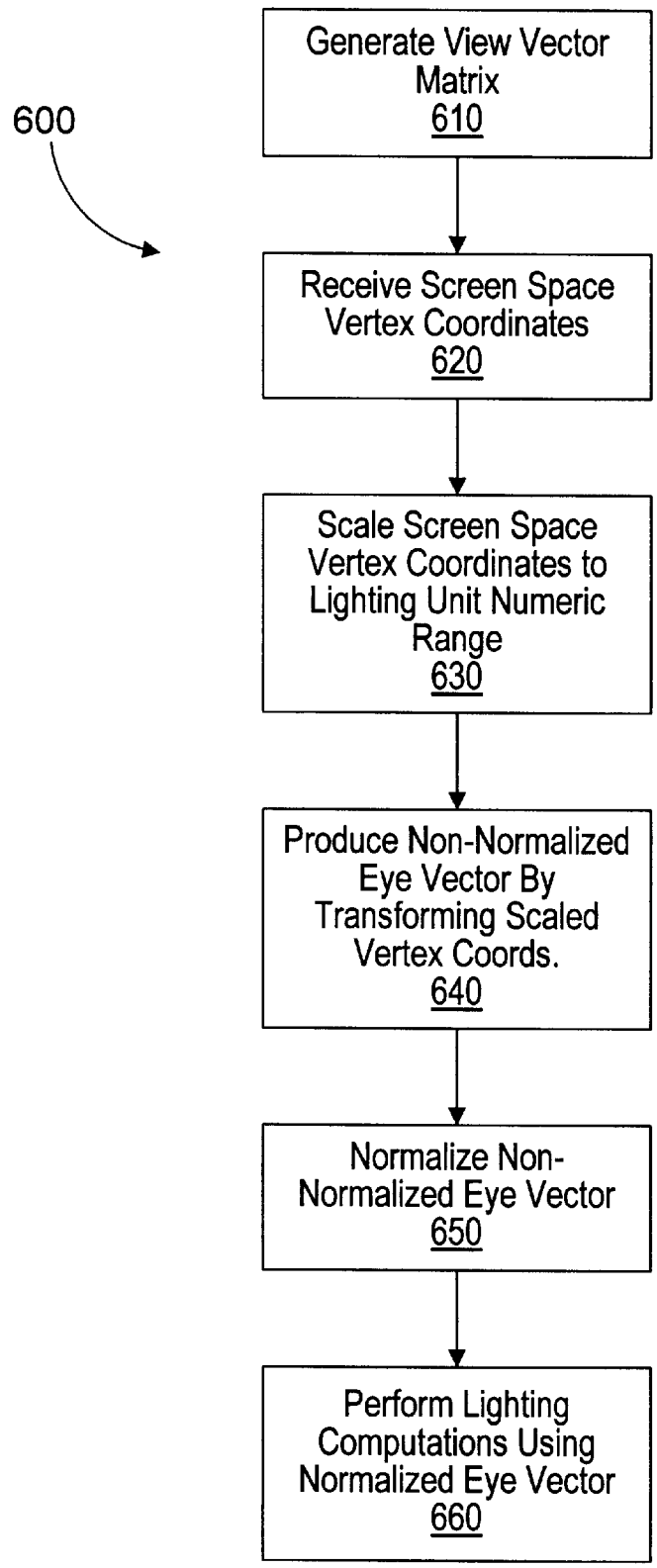
FIG. 7 is a flowchart depicting a method for computing a normalized local eye vector according to the preferred embodiment of the present invention.

FIG. 7—Computation of the Local Eye Vector

Referring now to FIG. 7, a method 600 is depicted for rapid computation of a local eye vector corresponding to a given eye position (e.g., eye position 508), and a given vertex (e.g., vertex 502). In step 610, a view vector matrix is generated. As will be described in further detail below, the view vector matrix is generated from the inverse matrix of the current viewing matrix and the screen space coordinates of the corners of a given viewport in which vertex 502 is to be mapped. In one embodiment, the view vector matrix is a sparse 3×3 matrix.

In step 620, L-core block 354 receives screen space coordinates for vertex 502. These coordinates are transferred via FL buffer 374, which also includes the coordinates for the other vertices of the triangle primitive of which vertex 502 is a part. In the preferred embodiment, these transformed vertices are concurrently sent from F-core block 352 to S-core block 356 for setup operations, so the vertex coordinates do not have to be exclusively generated for L-core block 354.

In step 630, L-core block 354 scales the screen space coordinates for vertex 502 to a representable numeric range. In one embodiment, F-core block 352 represents screen space coordinates using a s11.20 format (one sign bit, eleven integer bits, and 20 fractional bits). The maximum screen space values (1280.0 in X, 1024.0 in Y) can thus be represented (the maximum range is −40.0 to 1320.0 when guard band space is considered). L-core block 354 only has a numeric range of −2.0 to +2.0, however. A number of least significant fractional bits are thus discarded, and the incoming vertex coordinates are scaled to be represented in the s1.14 format of L-core 354. The result of the transfer of the coordinates from F-core 352 to L-core 354 is thus an automatic divide by 1024. The maximum numeric range of the coordinates then becomes approximately 0.039 to 1.289.

In step 640, a non-normalized eye vector is computed by performing a matrix multiply of the view vector matrix generated in step 610 with a vector representing the scaled screen space coordinates of vertex 502. This operation gives the components of (non-normalized) eye vector 516. This operation is possible because the angle from the eye position to a point on the screen is constant for all depths that map to that point.

As will be described below, the view vector matrix also performs scaling of eye vector 516 to aid with subsequent calculations. In some situations, the eye position 508 may be such that a valid eye vector (one that won't overflow the numeric range of L-core block 354) cannot be calculated. In one embodiment, the local eye vector calculation for these situations may be handled by a floating point unit such as F-core block 352. In the preferred embodiment, the transformation process of step 640 is executed by one L-core 354 microcode multiply-accumulate instruction.

In step 650, the non-normalized eye vector 516 computed in step 640 is normalized (converted to unit length in the same direction). In the preferred embodiment, this process comprises three L-core 354 microcode instructions. First, the non-normalized eye vector is squared (a dot product instruction). Next, the reciprocal of the dot product result is taken (an inverse square root instruction). Finally, the inverse square root result is multiplied by the original view vector value (a multiply instruction) to obtain the correct, normalized, local eye vector.

Figure 8A:
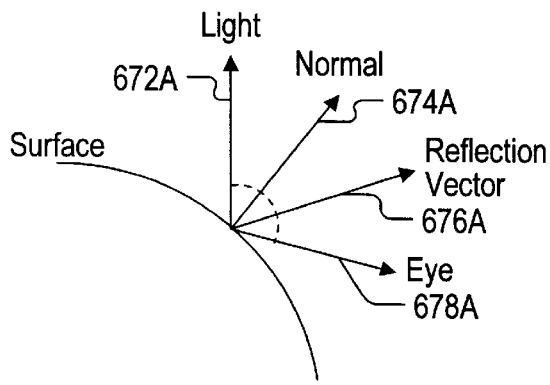
FIGS. 8A–8D depict the use of local eye vectors in computing specular reflection values.
Figure 8B:
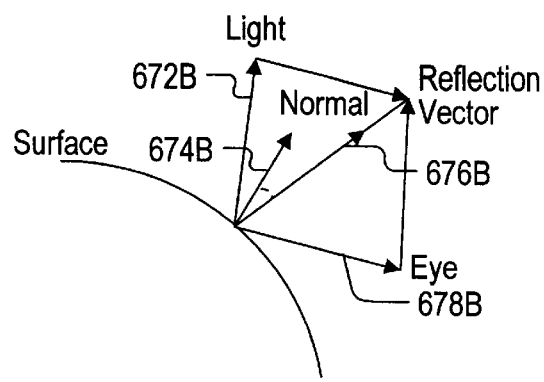

In step 660, the normalized local eye vector computed in step 650 is used to perform subsequent lighting calculations such as specular reflection values. Referring now to FIGS. 8A–8D, some examples of specular calculations are shown. In FIG. 8A, the specular reflection calculation is shown for XGL. In XGL, the amount of specular highlight is computed by calculating a reflection vector 676A from a light vector 672A and a normal vector 674A. The dot product of reflection vector 676A and eye vector 678A then determines the amount of specular reflection. In FIG. 8B, the specular reflection calculation is shown for OpenGL. In OpenGL, reflection vector 676B is computed to be halfway between eye vector 678B and light vector 672B. The specular value is determined from the dot product of reflection vector 676B and normal vector 674B. Both methods have advantages and disadvantages.

The OpenGL method, when used with an infinite eye position, allows calculation of the reflection vector once per light, requiring only one dot product operation per vertex. However, with a local eye point, the reflection vector must be calculated once per light for every vertex, which is quite expensive since a normalization operation is required.

Figure 8C:
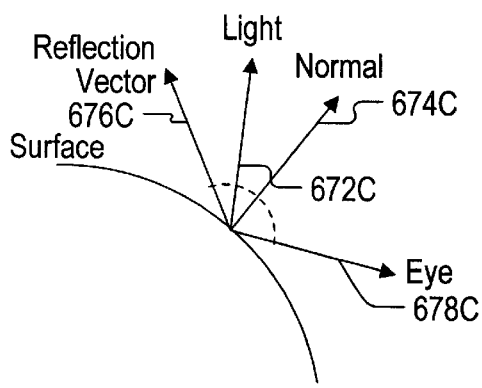
Figure 8D:
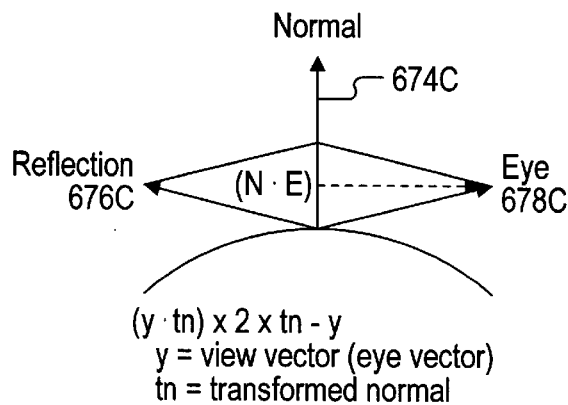

The XGL method may be rearranged slightly so that one reflection vector is calculated per vertex, with the same reflection vector used for each light. As shown in FIG. 8D, reflection vector 676C is computed from normal vector 674C and eye vector 678C. The dot product of normal vector 674C and eye vector 678C produces the height of the projection of eye vector 678C onto normal vector 674C. Multiplying this height by two and multiplying normal vector 674C with the result gives the point on normal vector 674C which is equivalent to the reflection vector added to eye vector 678C. Making use of parallelograms and subtracting eye vector 678C from this point gives the actual reflection vector 676C. Since both vectors were normalized to unit length before this operation, the result is also normalized. The dot product of reflection vector 676C with each light (e.g., light 672C) for a given vertex produces the amount of specular reflection, as shown in FIG. 8C.

Figure 9:
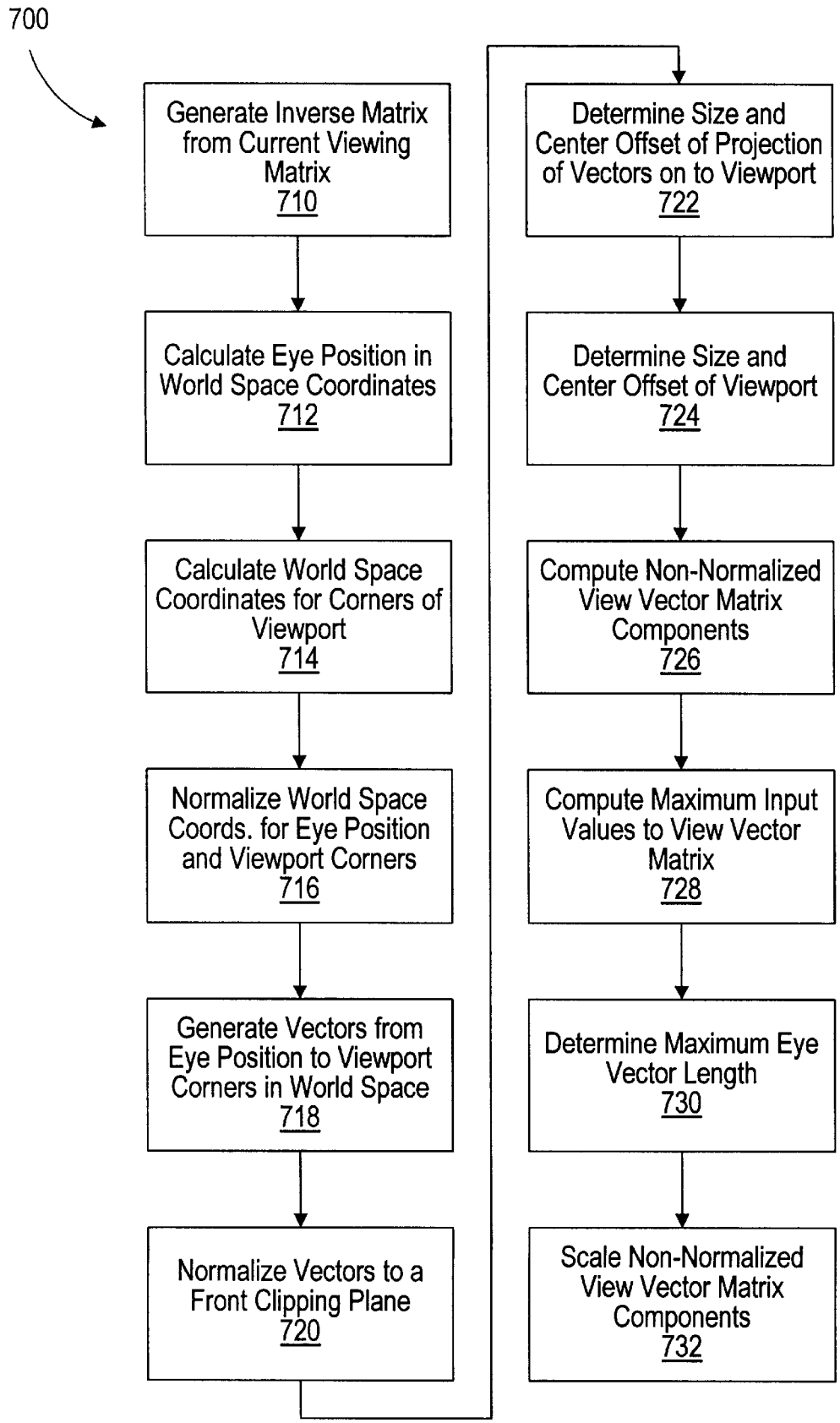
FIG. 9 is a flowchart depicting a method for computing a view vector matrix in the preferred embodiment of the present invention.

FIG. 9—Generation of the View Vector Matrix

Referring now to FIG. 9, a method 700 for generating a view vector matrix used as described above is depicted. In step 710, an inverse matrix is generated from the current viewing matrix. (The current viewing matrix is used to transform vertices from world space coordinates to screen space coordinates in an earlier stage of the graphics pipeline). In step 712, world coordinates are then computed for the given eye position using the inverse matrix. In the preferred embodiment, the world coordinates for the given eye position are simply the components of row 2 of the inverse matrix (see the code listing below). In step 714, the world space coordinates for corner coordinates of the given viewport are determined by transforming the clip space coordinates of the corners of given viewport with the inverse matrix computed in step 710. (In clip space coordinates, the left edge of the viewport is at x=−1.0, and the right edge is at x=+1.0. Similarly, the top edge of the viewport is at y=+1.0, with the bottom edge at y=−1.0. The four corners of the given viewport in (x, y) clip coordinates are thus (−1.0, +1.0) for the upper left corner, (+1.0, +1.0) for the upper right corner, (−1.0, −1.0) for the lower left corner, and (+1.0, −1.0) for the lower right corner. The z and w coordinates are 1.0 for each corner.)

In step 716, the world space coordinates for the corner coordinates of the given viewport are then normalized, as well as the world space coordinates for the given eye position. In step 718, the resulting world coordinates from step 716 are used to generate a plurality of vectors in world space from the normalized eye position to the corners of the viewport. These vectors thus define the view volume for the viewport. Next, in step 720, this plurality of vectors is normalized to the plane Z=1. After normalization, the size and center offset (in both x and y coordinates) are determined for the given viewport in step 722. Similarly, in step 724, the size of the projection of the plurality of vectors onto the given viewport is determined, as well as the center offset of the projection. The size and center offset of the given viewport are calculated in screen space coordinates, and are adjusted to the numeric range of L-core 354.

The size and center offset of the projection are used along with the size and center offset of the given viewport to calculate the non-normalized view vector matrix components in step 726. Next, the maximum input values to the view vector matrix are computed in step 728, which allows determination of a maximum view vector length in step 730. In step 732, the non-normalized view vector matrix components are then scaled to keep the maximum vector length within a predetermined range for the given viewport, giving the final view vector matrix component values.

Figure 6B:
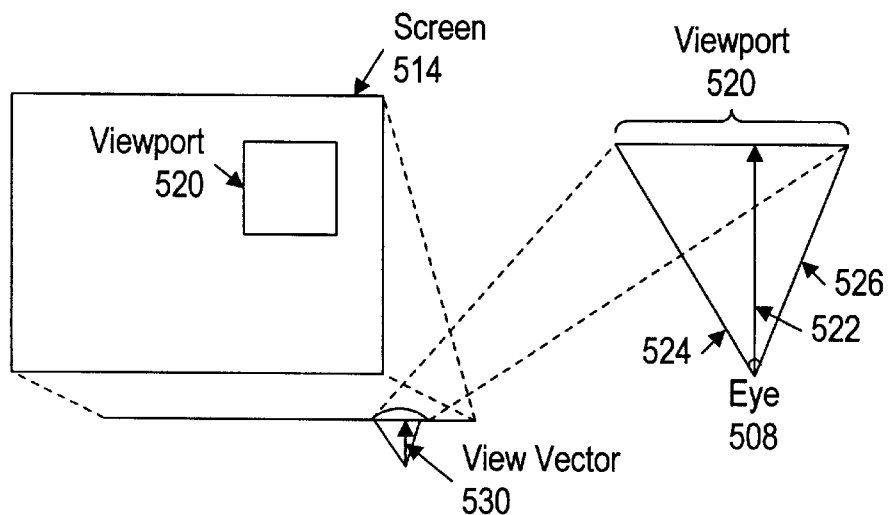
FIG. 6B depicts how view vectors are mapped to a given viewport on a display screen.

In the preferred embodiment, the predetermined range for a given viewport can be explained with reference to FIG. 6B. FIG. 6B depicts a viewport 520 within screen 514. View vector (another name for eye vector) 530 is calculated as described above with reference to method 600. View vector 530 is determined to be valid based on two criteria. First, the distance from eye position 508 to viewport 520 must be at least 0.5 in eye vector space (which is expressed in world coordinates). This distance is shown by line segment 522 in FIG. 6B. This minimum length prevents the normalization math from overflowing during the reciprocal square root operation. Secondly, the distance from eye position 508 to the farthest legal point of viewport 520 must be less than 1.0 to keep other parts of the math within range. These distances are represented by line segments 524 and 526. In other embodiments, these predetermined ranges may vary. In some situations, a valid local eye vector may not be able to be computed. In one embodiment, these local eye vectors are computed in a floating point unit such as F-core block 352.

Code Listing for Generation of View Vector Matrix

Shown below is the source code for calculation of the view vector matrix as performed in the preferred embodiment of the invention.

```
#define EPSILON            1e-6
#define IS_ZERO(val)       (fabs((double) (val)) < EPSILON)
/* 1e-30 is Phigs tolerance used in matrix inversion */
#define IS_ZERO_ELEM(vaL)  (fabs((double) (val)) < 1e-30)
typedef float matrix[4] [4]; typedef float vector[4];
int invert_mat(matrix,matrix);
int new_view_mat(matrix invmat, int left, int top, int right, int bottom,
    float * u1, float * u2, float * t1, float * t2, float * s);
void vec_len(float x, float y,
    float u1, float u2, float t1, float t2, float s, float * max);
void vec_range(float x, float y,
    float u1, float u2, float t1, float t2, float s, float * max, float * min);
void vec_x_mat(vector v, matrix m, vector d);
void normalize_4(vector v);
void normalize_3(vector v);
/* Global variables for view vector matrix calculations */
vector E;
/*
 * Matrix inversion routines.
 *
 * This routine is essentially a copy of phg_mat_inv( ) routine
 * taken from PHIGS source file . . . util/ut_mat.c.
 * The function returns 1 if the original matrix is singular
 *
 */
static int
invert_mat(matrix V, matrix Vinv)
{
    short index[4] [2], ipivot[4];
    float pivot[4];
    short row, colum;
    float max;
```

```
    short i, j, k, l;
    int d;
    register float *src = &V[0][0];
    register float *dst = &Vinv[0][0];
#ifdef DEBUG
for (i=0;i<4;i++) {
    for(j=0;j<4;j++) {
        printf("%g",V[i][i]);
    }
    printf("\n");
}
#endif DEBUG
    if(IS_ZERO (V[3][3])) {
        /* V is singular */
        fprintf(stderr, "Matrix is singular %g %g\n",
            IS_ZERO (V[3][3]), V[3][3]);
        return 1;
    }
#ifdef NDEF
    else if (! IS_ZERO (V[3][3] - 1.0)) {
        /* Divide every element of V by V[3][3] */
        float *vsrc, inv33;
        int i;
        vsrc = &V[0][0];
        inv33 = 1.0/V[3][3];
        for(i = 0; i < 12; i++)
            *vsrc = *vsrc++ * inv33;
        V[3][3] = 1.0;
    }
#endif
    /* copy V to Vinv */
    for (i = 0; i < 16; i++)
        *dst++ = *src++;
    d = 1;                      /* sign change for determinant */
    for (j = 0; j < 4; j++)
        ipivot[j] = 0;
    for (i = 0; i < 4; i++) {   /* do matrix inversion */
        max = 0.0;
        for (j = 0; j < 4; j++) {  /* search for pivot element */
            if (ipivot[j] == 1)
                continue;
            for (k = 0; k < 4; k++) {
                if (ipivot[k] == 1)
                    continue;
                if (fabs(max) < fabs(Vinv[j][k])) {
                    row = j;
                    column = k;
                    max = Vinv[j][k];
                }
            }
        }
        if (IS_ZERO_ELEM (max)) {
            /* input matrix is singular, return */
            return 1;
        }
        ipivot[column] += 1;
        if (row != column) { /* interchange rows to put */
            d *= -1;         /* pivot element on diagonal */
            for (1 = 0; 1 < 4; 1++) {
                max = Vinv[row][1];
                Vinv[row][1] = Vinv[colum][1];
                Vinv[colum][1] = max;
            }
        }
        index[i][0] = row;
        index[i][1] = colum;
        pivot[i] = Vinv[colum][colum];
        if(IS_ZERO_ELEM (pivot[i])) {
            /* Matrix is singular */
            return 1;
        }
        Vinv[colum][colum] = 1.0;/* divide pivot row by pivot element */
        for (1 = 0; 1 < 4; 1++)
            Vinv[colum][1]/= pivot[i];
        for (j = 0; j < 4; j++)
        if (j != colum) {
            max = Vinv[j][colum];
            Vinv[j][colum] = 0.0;
            for (1 = 0; 1 < 4; 1++)
                Vinv[j][1] -= Vinv[colum][1] * max;
```

```
        }
    }
    for (i = 0; i < 4; i++) { /* interchange columns */
        1 = 4 - 1 - i;
        if (index[1] [0] != index[1] [1]) {
            row = index[1] [0];
            colum = index[1] [1];
            for (k = 0; k < 4; k++) {
                max = Vinv[k] [row];
                Vinv[k] [row] = Vinv[k] [colum];
                Vinv[k] [colum] = max;
            }
        }
    }
    /* determinant is d * pivot[0] * pivot[1] * pivot[2] * pivot[3] */
    return 0;
} /* End of invert_mat */
/*
 * new_view_mat
 *
 *    Compute a view matrix using the new formula.
 *    The matrix is in the form:
 *        [ u1 0 0 ]
 *        [ 0 u2 0 ]
 *        [ t1 t2 s ]
 *    Return 1 if valid matrix, 0 if invalid.
 */
int
new_view_mat(matrix invmat, int left, int top, int right, int bottom,
    float * r_u1, float * r_u2, float * r_t1, float * r_t2, float * r_s)
{
vector ll, ul, ur, lr, eye;                /* Clip coords */
vector wcll, wcul, wcur, wclr, wceye;      /* World coords */
vector vll, vul, vur, vlr;
float t1, t2, u1, u2, s;                   /* View vector matrix components */
float x_size, y_size;                      /* Size of projection */
float x_center, y_center;                  /* Center values in projection */
float ssx_size, ssy_size;                  /* Screen space size */
float ssx_center, ssy_center;              /* Screen space center */
float x_out, y_out;                        /* How far out a vertex can go */
float x_min, x_max, y_min, y_max;          /* Screen coordinate extremes */
float min, max;                            /* Vector length extremes */
float mul_max;                             /* Maximum intermediate value */
float mat_scale;                           /* Matrix scale factor */
/*-
 * Calculate the eye point in world coordinates from the eye point
 * in clip coordinates. Send [0, 0, 1, 0] through the inverse
 * view transform matrix. Obviously, this is just row 2 of the
 * matrix.
 */
wceye[0] = invmat[2] [0];
wceye[1] = invmat[2] [1];
wceye[2] = invmat[2] [2];
wceye[3] = invmat[2] [3];
/*-
 * Calculate the corners of the window in world coordinates by
 * sending through the corners in clip coordinates.
 */
ll[0] = -1.0;
ll[1] = -1.0;
ll[2] = 1.0;
ll[3] = 1.0;
vec_x_mat(ll, invmat, wcll);
ul[0] = -1.0;
ul[1] = 1.0;
ul[2] = 1.0;
ul[3] = 1.0;
vec_x_mat(ul, invmat, wcul);
lr[0] = 1.0;
lr[1] = -1.0;
lr[2] = 1.0;
lr[3] = 1.0;
vec_x_mat(lr, invmat, wclr);
ur[0] = 1.0;
ur[1] = 1.0;
ur[2] = 1.0;
ur[3] = 1.0;
vec_x_mat(ur, invmat, wcur);
/* Normalize them all to a W of 1.0 */
normalize_4(wceye);
```

```
normalize_4(wcll);
normalize_4(wcul);
normalize_4(wclr);
normalize_4(wcur);
fprintf(afb_file, "lc_eye_vector\n");
fprintf(afb_file, "\t%10.6f%10.6f%10.6f\n", 0.0, 0.0, 1.0);
fprintf(afb_file, "\t%10.6f%10.6f%10.6f\n", wceye[0], wceye[1], wceye[2]);
    /* Get the vectors from the eye to the corner of the view volume */
    vll[0] = wceye[0] - wcll[0];
    vll[1] = wceye[1] - wcll[1];
    vll[2] = wceye[2] - wcll[2];
    vll[3] = 1.0;
    vul[0] = wceye[0] - wcul[0];
    vul[1] = wceye[1] - wcul[1];
    vul[2] = wceye[2] - wcul[2];
    vul[3] = 1.0;
    vlr[0] = wceye[0] - wclr[0];
    vlr[1] = wceye[1] - wclr[1];
    vlr[2] = wceye[2] - wclr[2];
    vlr[3] = 1.0;
    vur[0] = wceye[0] - wcur[0];
    vur[1] = wceye[1] - wcur[1];
    vur[2] = wceye[2] - wcur[2];
    vur[3] = 1.0;
    /* Now normalize these vectors to the plane Z=1 */
    normalize_3(vll);
    normalize_3(vul);
    normalize_3(vlr);
    normalize_3(vur);
    /* Get the size of the projection and the center offset */
    x_size = vlr[0] - vll[0];
    x_center = (vlr[0] + vll[0])/2.0;
    y_size = vlr[1] - vul[1];
    y_center = (vlr[1] + vul[1])/2.0;
    /* Get the same for window in screen space (adjusted for L-Core numerics) */
    ssx_size = (float) (right - left)/1024.0;
    ssx_center = ((float) (right + left)/2.0)/1024.0;
    ssy_size = (float) (bottom - top)/1024.0;
    ssy_center = ((float) (bottom + top)/2.0)/1024.0;
    /* Now the compute the unnormalized matrix components */
    u1 = x_size/ssx_size;
    u2 = y_size/ssy_size;
    t1 = -(ssx_center + (x_center/u1)) * u1;
    t2 = -(ssy_center - (y_center/u2)) * u2;
    s = 1.0;
    /* We have a valid matrix, now scale it to prevent overflow */
    x_out = ssx_size/2.0 * 0.05;   /* 5% margin for guard band */
    y_out = ssy_size/2.0 * 0.05;
    /* Compute the extremes that could ever go through this matrix */
    x_max = left/1024.0 - x_out;
    x_min = right/1024.0 + x_out;
    y_min = top/1024.0 - y_out;
    y_max = bottom/1024.0 + y_out;
    /* Send the values through and get maximum vector length */
    max = 0.0;
    vec_len(x_min, y_min, u1, u2, t1, t2, s, &max);
    vec_len(x_min, y_max, u1, u2, t1, t2, s, &max);
    vec_len(x_max, y_min, u1, u2, t1, t2, s, &max);
    vec_len(x_max, y_max, u1, u2, t1, t2, s, &max);
    /* Scale all matrix values to keep longest vector within range */
    mat_scale = 1.0;
    if (max > 1.0)                    /* sqrt(2) with 5% margin */
        mat_scale = 1.0/max;
    u1 *= mat_scale;
    u2 *= mat_scale;
    t1 *= mat_scale;
    t2 *= mat_scale;
    s *= mat_scale;
    /* Now go check again to make sure there are no math overflows */
    mul_max = 0.0;
    min = 2.0;
    vec_range(x_min, y_min, u1, u2, t1, t2, s, &mul_max, &min);
    vec_range(x_min, y_max, u1, u2, t1, t2, s, &mul_max, &min);
    vec_range(x_max, y_min, u1, u2, t1, t2, s, &mul_max, &min);
    vec_range(x_max, y_max, u1, u2, t1, t2, s, &mul_max, &min);
    /* If min > 0.5 at this point, the matrix could be good */
    /* A skew to one side can still be valid (would require more testing) */
    vec_range(0.0, 0.0, u1, u2, t1, t2, s, &mul_max, &min);
    *r_u1 = u1;
    *r_u2 = u2;
```

```
        *r_t1 = t1;
        *r_t2 = t2;
        *r_s = s;
        if (min > 0.5)
                return 1;            /* Valid matrix */
        else
                return 0;            /* Invalid matrix */
} /* End of new_view_mat */
/*
 * vec_len
 *      Run the specified screen-space vector through the view vector
 *      matrix, Determine the length of the result. If the result
 *      exceeds max, it is the new max.
 */
void
vec_len(float x, float y,
    float u1, float u2, float t1, float t2, float s,
    float * max)
{
  float newx, newy, newz;
  float len;
  newx = x * u1 + t1;
  newy = y * u2 + t2;
  newz = s;
  len = sqrt(newx * newx + newy * newy + newz * newz);
  if (len > *max)
        *max = len;} /*End of vec_len */
/*
 * vec_range
 *
 *      Run the specified screen-space vector through the view vector
 *      matrix. Check all intermediate results for fixed-point
 *      numeric overflow. Then determine the length of the result.
 *      If the result is less than min, it is the new min.
 */
void
vec_range(float x, float y,
    float u1, float u2, float t1, float t2, float s,
    float * max, float * min)
{
  float newx, newy, newz;
  float len;
  float max_temp;
  newx = x * u1;
  max_temp = fabs(newx);
  newx += t1;
  if(fabs(newx) > max_temp)
        max_temp = fabs(newx);
  newy = y * u2;
  if (fabs(newy) > max_temp)
        max_temp = fabs(newy);
  newy += t2;
  if (fabs(newy) > max_temp)
        max_temp = fabs(newy);
  newz = s;
  if(/*(max_temp > 1.99) && */ (max_temp > *max))
        *max = max_temp;
  len = sqrt(newx * newx + newy * newy + newz * newz);
  if (len < *min)
        *min = len; } /* End of vec_range */
/*
 * vec_x_mat
 *
 *      Multiply the vector v by the matrix m, returning d.
 */
void
vec_x_mat(vector v, matrix m, vector d)
{
  d[0] = v[0] * m[0] [0] + v[1] * m[1] [0] + v[2] * m[2] [0] + v[3] * m[3] [0];
  d[1] = v[0] * m[0] [1] + v[1] * m[1] [1] + v[2] * m[2] [1] + v[3] * m[3] [1];
  d[2] = v[0] * m[0] [2] + v[1] * m[1] [2] + v[2] * m[2] [2] + v[3] * m[3] [2];
  d[3] = v[0] * m[0] [3] + v[1] * m[1] [3] + v[2] * m[2] [3] + v[3] * m[3] [3];
}
/*
 * normalize_4
 *
 *      Normalize a 4-component vector.
 */
void normalize_4(vector v)
{
```

```
    v[0]/= v[3];
    v[1]/= v[3];
    v[2]/= v[3];
    v[3]= 1.0;
} /* End of normalize_4 */
/*
 * normalize_4
 *
 *     Normalize a 3-component vector.
 */
void normalize_3(vector v)
{
    v[0]/= v[2];
    v[1]/= v[2];
    v[2]= 1.0;
} /* End of normalize_3 */
```

We claim:

1. A method for calculating a local eye vector in a fixed point lighting unit, wherein said local eye vector corresponds to a given eye position and a first vertex of a given triangle primitive, wherein said given triangle primitive is to be projected into a given viewport, said method comprising:

generating a view vector matrix which corresponds to said given eye position and corner coordinates of said given viewport, wherein said corner coordinates are screen space coordinates, and wherein said view vector matrix is usable to map screen space coordinates to an eye vector space corresponding to said given viewport;

receiving a first set of coordinates corresponding to said first vertex, wherein said first set of coordinates are screen space coordinates;

scaling said first set of coordinates to a numeric range representable by said fixed point lighting unit;

transforming said first set of coordinates using said view vector matrix, wherein said transforming produces a non-normalized local eye vector, wherein said non-normalized local eye vector is usable to perform lighting computations.

2. The method of claim 1, further comprising normalizing said non-normalized local eye vector, thereby producing a normalized local eye vector.

3. The method of claim 2, further comprising performing said lighting computations using said normalized local eye vector.

4. The method of claim 1, wherein said view vector matrix is calculated from said corner coordinates of said given viewport and an inverse matrix of a current viewing matrix, wherein said current viewing matrix is usable to transform vertices from world space coordinates to screen space coordinates, wherein said current viewing matrix is dependent upon said given eye position.

5. The method of claim 4, wherein said generating said view vector matrix comprises:

calculating world coordinates for said given eye position from said inverse matrix;

calculating world space coordinates for said corner coordinates of said given viewport using said inverse matrix and clip space coordinates of said given viewport;

normalizing said world space coordinates for said corner coordinates of said given viewport, thereby producing normalized world space corner coordinates;

normalizing said world space coordinates for said given eye position, thereby producing normalized world space eye coordinates;

generating a plurality of vectors in world space coordinates from said normalized world space eye coordinates to each of said normalized world space corner coordinates;

normalizing said plurality of vectors to a front clipping plane of said given viewport;

determining the size of a projection of said plurality of vectors on to said given viewport;

determining a center offset of said projection;

determining the size of said given viewport and a center offset of said first viewport in screen space coordinates, wherein said size of said given viewport and said center offset of said given viewport are adjusted to be representable by said lighting unit;

computing non-normalized view vector matrix components from said size of said projection, said center offset of said projection, said size of said given viewport, and said center offset of said given viewport;

computing maximum input values to said view vector matrix;

determining a maximum view vector length by transforming said maximum input values using said non-normalized view vector matrix components;

scaling said non-normalized view vector matrix components to keep said maximum vector length within a predetermined range, thereby producing final view vector matrix component values.

6. The method of claim 5, wherein said generating said view vector matrix further includes determining if said final view vector matrix components form a valid matrix.

7. The method of claim 5, wherein said maximum view vector length is within said predetermined range if said maximum view vector length is calculated to be less than 1.0 in scaled world space coordinates.

8. The method of claim 6, wherein said final view vector matrix components form said valid matrix if said maximum view vector length is less than 1.0 in said scaled world space coordinates and the distance from said given eye position to said given viewport is at least 0.5 in said scaled world space coordinates.

9. The method of claim 8, further comprising calculating said normalized local eye vector in a separate floating point unit in response to said view vector matrix components not forming said valid matrix.

10. The method of claim 1, wherein said first set of coordinates corresponding to said first vertex are conveyed from a floating point unit which is configured to transform world space vertex coordinates to screen space vertex coordinates.

11. The method of claim 1, wherein said scaling said first set of coordinates includes truncating selected bits of each of said first set of coordinates to a range representable by said lighting unit.

12. The method of claim 1, wherein said transforming said first set of coordinates using said view vector matrix is performed by a single microcode instruction being executed by said lighting unit.

13. The method of claim 1, wherein said transforming said first set of coordinates includes performing a matrix multiply of said view vector matrix and said first set of coordinates.

14. The method of claim 1, wherein said lighting computations include calculating specular highlights for an infinite light source using said normalized local eye vector.

15. The method of claim 1, wherein said first set of coordinates corresponding to said first vertex are concurrently conveyed to said lighting unit and a setup unit from a floating point unit configured to perform transformation of vertices of a plurality of triangle primitives.

16. A method for generating a view vector matrix for a given eye position, wherein said view vector matrix is usable to transform a first vertex of a given triangle primitive from screen space coordinates to world space coordinates, wherein said given triangle primitive is within a given viewport, said method comprising:

generating an inverse matrix from a current viewing matrix, wherein said current viewing matrix is usable to transform vertices from world space coordinates to screen space coordinates;

calculating world coordinates for said given eye position from said inverse matrix;

calculating world space coordinates for corner coordinates of said given viewport using said inverse matrix and clip space coordinates of said given viewport;

normalizing said world space coordinates for said corner coordinates of said given viewport, thereby producing normalized world space corner coordinates;

normalizing said world space coordinates for said given eye position, thereby producing normalized world space eye coordinates;

generating a plurality of vectors in world space coordinates from said normalized world space eye coordinates to each of said normalized world space corner coordinates;

normalizing said plurality of vectors to a front clipping plane of said given viewport;

determining the size of a projection of said plurality of vectors on to said given viewport;

determining a center offset of said projection;

determining the size of said given viewport and a center offset of said given viewport in screen space coordinates, wherein said size of said given viewport and said center offset of said given viewport are adjusted to a given numeric range;

computing non-normalized view vector matrix components from said size of said projection, said center offset of said projection, said size of said given viewport, and said center offset of said given viewport;

computing maximum input values to said view vector matrix;

determining a maximum view vector length by transforming said maximum input values using said non-normalized view vector matrix components;

scaling said non-normalized view vector matrix components to keep said maximum vector length within a predetermined range, thereby producing final view vector matrix component values.

17. The method of claim 16, further comprising determining if said final view vector matrix components form a valid matrix.

18. The method of claim 17, further comprising calculating said normalized local eye vector in a separate floating point unit in response to said view vector matrix components not forming said valid matrix.

19. The method of claim 16, wherein said maximum view vector length is within said predetermined range if said maximum view vector length is calculated to be less than 1.0 in scaled world space coordinates.

20. The method of claim 19, wherein said final view vector matrix components form said valid matrix if said maximum view vector length is less than 1.0 in said scaled world space coordinates and the distance from said given eye position to said given viewport is at least 0.5 in said scaled world space coordinates.

21. A fixed point lighting unit for calculating a local eye vector, wherein said local eye vector corresponds to a given eye position and a first vertex of a given triangle primitive, wherein said given triangle primitive is to be projected into a given viewport, said fixed point lighting unit comprising:

a plurality of memory locations configured to store components of a view vector matrix, is calculated from said corner coordinates of said given viewport and an inverse matrix of a current viewing matrix, wherein said current viewing matrix is usable to transform vertices from world space coordinates to screen space coordinates, wherein said current viewing matrix is dependent upon said given eye position;

an input vertex coordinate buffer configured to receive a first set of coordinates corresponding to said first vertex, wherein said first set of coordinates are screen space coordinates, wherein said fixed point lighting unit is configured to scale said first set of coordinates to a numeric range representable by said fixed point lighting unit;

a fixed point arithmetic unit configured to transform said first set of coordinates under control of a first lighting routine, thereby producing a non-normalized local eye vector, wherein said first lighting routine includes using said view vector matrix, and wherein said non-normalized local eye vector is usable to perform lighting computations.

22. The fixed point lighting unit of claim 21, wherein said arithmetic unit is further configured to normalize said non-normalized local eye vector, thereby producing a normalized local eye vector.

23. The fixed point lighting unit of claim 22, wherein said fixed point lighting unit is further configured to perform lighting computations using said normalized local eye vector.

* * * * *